2 Sheets--Sheet 1.

T. F. WINGO.
Bee-Hives.

No. 153,696. Patented Aug. 4, 1874.

Witnesses;
L. P. Himer.
John C. Gallagher

Inventor;
Theodore F. Wingo
By J. McC. Perkins
Attorney.

T. F. WINGO.
Bee-Hives.

No. 153,696.

2 Sheets--Sheet 2.

Patented Aug. 4, 1874.

Witnesses;
L. P. Himer
John C. Gallagher.

Inventor;
Theodore F. Wingo
By J. MC. Perkins
Attorney.

UNITED STATES PATENT OFFICE.

THEODORE F. WINGO, OF GREENFIELD, TENNESSEE.

IMPROVEMENT IN BEE-HIVES.

Specification forming part of Letters Patent No. 153,696, dated August 4, 1874; application filed May 23, 1874.

*To all whom it may concern:*

Be it known that I, THEODORE F. WINGO, of Greenfield, in the county of Weakley and State of Tennessee, have invented certain new and useful Improvements in Bee-Hives; and I do hereby declare the following to be a full, clear, and exact description thereof, reference being had to the accompanying drawings, and to the letters of reference marked thereon.

The nature of my invention consists in the construction and arrangement of a bee-hive, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
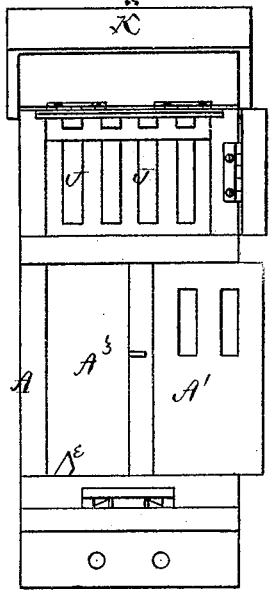
Figure 2:
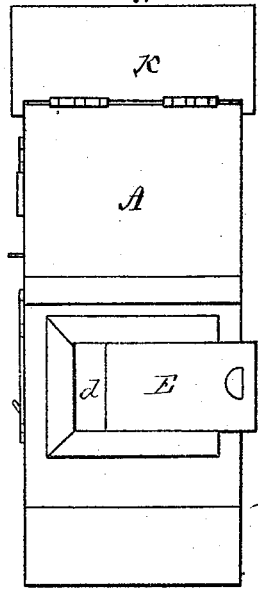
Figure 3:
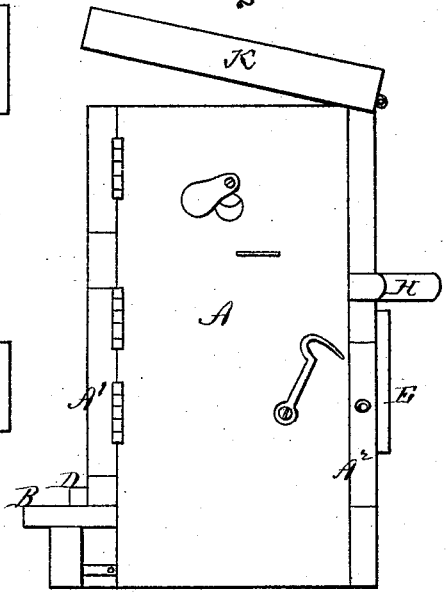
Figure 4:
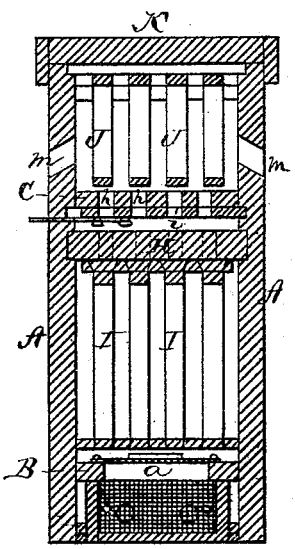
Figure 5:
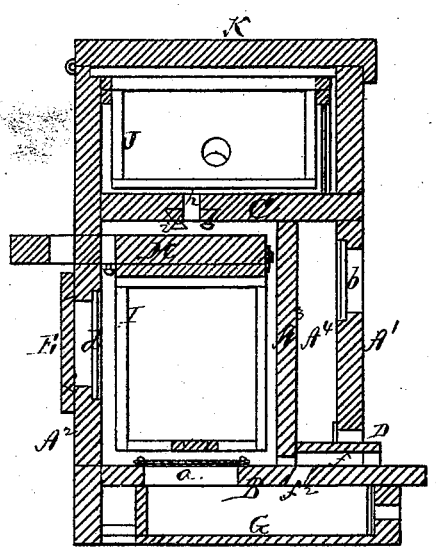
Figure 6:
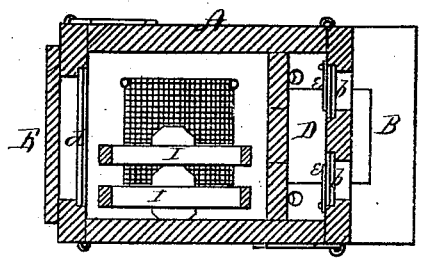
Figure 7:
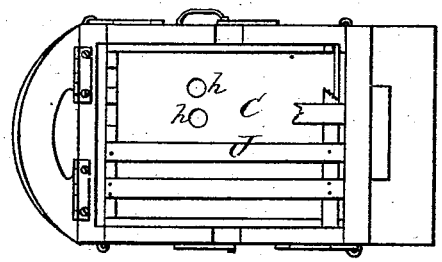
Figure 8:
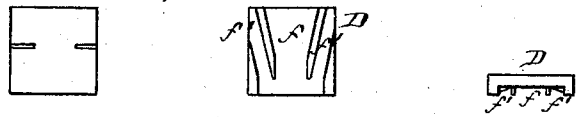

Figure 1 is a front view of the hive, partly open. Fig. 2 is a rear view, and Fig. 3 a side elevation, of the same. Fig. 4 is a transverse vertical section, and Fig. 5 a longitudinal vertical section, of the hive. Fig. 6 is a horizontal section of the hive. Fig. 7 is a plan view of the same with the top cap removed, and Fig. 8 shows the entrance into the hive.

A represents the box or hive proper, provided with a bottom, B, a suitable distance above the lower end thereof, and the box is, by a stationary dividing-board, C, divided into the brood-chamber below and honey-box above. The bottom is extended in front to form the alighting-board, and has a suitable ventilator, $a$, within the hive. The front and back of the brood-chamber form doors, the front door $A^1$ having windows $b\ b$, and the back door $A^2$ one window, $d$, covered by a slide, E. A short distance from the front door $A^1$, within the hive, is a false back, $A^3$. Between these is formed the moth-chamber $A^4$. Across this chamber, on the bottom B, is placed a board, D, which is movable, and held in place by pivoted catches E E. On the under side of this board are formed three passages, $f$ and $f^1\ f^1$, the center passage $f$ leading directly into the hive through the false back $A^3$, while the side passages $f^1$ lead into the chamber $A^4$. These latter passages should be made tapering, so that the bees cannot pass through, while the insects, attracted by the light through the windows $b$, will pass through them into said chamber, and thence pass through passages $f^2$ into the drawer G below. Through the back, a short distance below the dividing-board C, is inserted into the brood-chamber a sliding board, H, in the under side of which are formed dovetailed grooves for the comb-frames I I to slide into. When the back door $A^2$ is opened any one or more frames can be easily taken out, or all the frames be taken out at once by simply removing the board H. This board does not reach close to the false back $A^3$, but leaves a space, as shown in Fig. 5, and has a slot at the back edge of the frames, so that the bees can pass up both in front and rear of the frames. The dividing-board C is provided with suitable passages $h$ for the bees to pass from the brood-chamber to the honey-box, and vice versa, and these passages may be closed, when desired, by means of a perforated slide, $i$, dovetailed into the under side of the dividing-board. From the honey-box are inclined passages $m\ m$, for the bees to pass in and out, if desired. J J are the frames in the honey-box, and K' is the hinged top of the hive.

Having thus fully described my invention, what I claim as new, and desire to secure by Letters Patent, is—

1. The combination of the sliding board H, provided with dovetail grooves, and the comb-frames I I sliding therein, substantially as herein set forth.

2. The hive A, provided with the false back $A^3$, forming a moth-chamber, $A^4$, at the front of the brood-chamber, in combination with the board D, provided with the passages $f$ and $f^1\ f^1$, substantially as and for the purposes herein set forth.

3. The combination of the hive A, bottom B, false back $A^3$, moth-chamber $A^4$, drawer G, board D, and passages $f,\ f^1$, and $f^2$, all constructed as and for the purposes herein set forth.

In witness that I claim the foregoing I have hereunto set my hand.

THEODORE F. WINGO.

In presence of—
 R. E. BRASFIELD,
 T. J. FEATHERSTON.